United States Patent [19]

West

[11] Patent Number: 5,419,008
[45] Date of Patent: May 30, 1995

[54] BALL JOINT

[76] Inventor: Mark West, 1360 Gloucester Ct., Hoffman Estates, Ill. 60195

[21] Appl. No.: 87,664

[22] Filed: Jul. 6, 1993

Related U.S. Application Data

[63] Continuation-in-part of Ser. No. 783,640, Oct. 24, 1991, Pat. No. 5,186,270.

[51] Int. Cl.6 .............................................. B60B 33/08
[52] U.S. Cl. ...................................................... 16/25
[58] Field of Search ................................. 16/25, 26, 27

[56] References Cited

U.S. PATENT DOCUMENTS

| | | | |
|---|---|---|---|
| 406,185 | 7/1889 | Weir | 16/27 |
| 2,451,353 | 10/1948 | Newell | 16/27 |

FOREIGN PATENT DOCUMENTS 9691 of 1910 United Kingdom ...................... 16/27

Primary Examiner—P. Austin Bradley
Assistant Examiner—Chuck Y. Mah

[57] ABSTRACT

A ball joint assembly comprising a base member, a spherical member, a ring of at least three rolling members mounted around the spherical member such that a point on a rolling surface of each of the at least three rolling members contacts a point on a first great circle on the surface of the spherical member, the ring of rollers being freely rotatable around the axis of the first great circle, at least two capture rolling members, one capture rolling member being mounted such that a rolling surface of the one capture rolling member is in contact with a point on the surface of the spherical member above the plane of the first great circle and another capture rolling member being mounted such that a rolling surface of the other roller member is in contact with a point below the plane of the first great circle.

13 Claims, 11 Drawing Sheets $$\begin{bmatrix} \omega_1 \\ \omega_2 \\ \omega_3 \end{bmatrix} = \frac{1}{r} \begin{bmatrix} -1 & 0 & d \\ 1/2 & -\frac{\sqrt{3}}{2} & d \\ 1/2 & \frac{\sqrt{3}}{2} & d \end{bmatrix} \begin{bmatrix} V_X \\ V_Y \\ \Omega \end{bmatrix}$$

BALL JOINT

CROSS-REFERENCE TO RELATED APPLICATIONS

This application is a continuation-in-part of U.S. Pat. application Ser. No. 07/783,640, filed Oct. 24, 1991, for OMNIDIRECTIONAL VEHICLE, now U.S. Pat. No. 5,186,270, the disclosure of which is expressly incorporated herein by reference.

The present invention relates to ball joints having a spherical ball which is supported with its center maintained in a stationary translational position relative to a base and which is rotatable in two or three degrees of freedom and more particularly to a ball joint which is supported and rotatable around one or more ball axes solely by rolling contact with rollers with a minimum of sliding or slipping movement of the ball on the rollers during rotational movement of the ball.

The operation of ball joints is complicated by the fact that the spherical ball whose rotational movement around one or more ball axes is responsible for achieving the desired operation of the apparatus containing the ball joint must hold the center of the ball stationary against translational movement relative to the apparatus but simultaneously provide as little restriction as possible on the rotational degrees of freedom of the ball.

Prior apparati for mounting and controllably driving a spherical ball involve assemblies of components which are cumbersome, complex and costly to manufacture. Regardless of how the ball is mounted, rotational degrees of freedom are inevitably restricted by the support and drive mechanisms which must make contact with the ball surface. Although the ball may twist around a point contact with a support or drive roller, the ball should not slide or slip along the point of contact because the support or drive mechanism will deteriorate as a result of sliding or slippage.

SUMMARY OF THE INVENTION

In the present invention, a ring of at least three passive freely rotatable support rollers are mounted such that each support roller is in frictional point contact with a great circle on the surface of a spherical ball. The ring of support rollers is mounted, typically on a circular ball bearing ring, such that the entire ring of rollers is freely rotatable around the center of the great circle. By providing point contacts on the ball surface around a great circle, and allowing the ring to be rotatable around the great circle, the ring of rollers places no restriction on rotation of the ball around the axis of the great circle and further allows the ball to rotate around any axis through the center of the ball without slippage or sliding of the ball surface at the points of contact with the support rollers. When the ball rotates around any axis through the center of the ball other than the axis of the great circle, the ball surface will twist around the points of roller contact but will not slip or slide thereby placing little or no restriction on the rotational degrees of freedom of the ball and preserving the integrity of the ball and roller surfaces which are in contact with each other. If the support rollers are alternatively mounted in point contact with a circle on the ball surface other than a great circle, the ball cannot rotate around any axis through the center of the ball other than the non-great circle axis without some slippage or sliding.

Similarly, the invention provides at least two additional rollers in point frictional contact with the ball surface with the axes of the additional rollers being coplanar with a second great circle on the ball surface. The additional rollers are provided for capturing the ball within the ring of rollers and/or for purposes of providing frictional driving of the ball. The axes of the additional rollers are preferably coplanar with a second great circle as opposed to a non-great circle on the ball surface for the same reason as the ring of support rollers are preferably mounted in point contact with a great circle, i.e., to maximize the rotational degrees of freedom of the ball and minimize slippage of the ball surface with the points of contact with the additional rollers. The additional rollers may be passive and freely rotatable or may be drivable around their axes so as to provide controllably driven rotation of the ball.

The at least three rollers of the rotatable support ring are disposed around the ring such that the point contacts of the at least three support rollers extend around a great circular arc of the ball of greater than 180° thereby assisting in capturing the ball within the great circle. Where the minimum of three rollers is employed, the three rollers are preferably disposed such that their point contacts are made at equilateral triangle points, i.e., at positions spaced 120° apart around the great circle ball surface.

The present invention thus provides a simplified mechanical assembly which can simultaneously support a spherical ball and also provide controllable or passive rotational movement of the ball in at least two degrees of freedom, i.e. independent rotational movement of the ball around at least two distinct axes through the center of the ball, without slippage of the ball along the surface of the support or drive mechanisms which contact the ball.

In accordance with the invention there is provided a ball joint assembly comprising a base member, a ring of at least three rolling members rotatably mounted on the base member, a spherical member disposed within the ring of rolling members, the rolling members being in point contact with a great circle on the surface of the spherical member, the ring of rolling members being rotatable around the center of the great circle, and a set of at least two capture rolling members, one capture rolling member being in point contact with the surface of the spherical member above the great circle and another capture rolling member being in point contact with the surface of the spherical member below the great circle.

Further, in accordance with the invention there is provided a ball joint comprising a spherical member; a set of at least three rolling members supported in contact with a first great circle on the surface of the spherical member; a base member having a fixed location in which the spherical member is supported; the center of the spherical member being fixedly disposed in the selected location relative to the base member for rolling motion around multiple axes through the center of the spherical member, and a driving mechanism which controllably rotates the spherical member around one or more selected axes of the spherical member in rolling contact with the rolling members.

Each of the rolling members typically comprises a roller having an axis, a point on the surface of each roller being in contact with the first great circle wherein the axis of each roller is coplanar with the first great circle.

The driving mechanism typically comprises two or more rollers each having a surface and an axis with a point on the surface of each roller being in contact with a second selected circle on the surface of the spherical member and at least one of the rollers being controllably driven around its axis. The axes of the drive rollers are preferably coplanar with the second selected circle. The second selected circle is preferably a second great circle on the surface of the spherical member.

The points of contact of each of the driven rollers with the surface of the spherical member may both be on one side above or below the plane of the first great circle; or, the point of contact of the driven rollers with the surface of the spherical member may be on opposite sides of the first great circle, one point of contact above the plane of the first great circle and the other point of contact below the plane of the first great circle.

Most preferably the set of at least three support rollers are mounted on the base member such that the set of support rollers are freely rotatable around the center of the first great circle.

The axes of the drive rollers are preferably coplanar with the second selected circle.

There is also provided a vehicle comprising a platform having at least three friction drive ball joints mounted thereon. Each friction drive ball joint of the vehicle comprises a spherical member mounted on the platform such that a point on the surface of each spherical member lies in the same plane for simultaneously contacting a substantially planar support surface and each friction drive ball joint comprises:
 (a) a set of at least three roller members supported in contact with a first great circle on the surface of the spherical member; (b) the spherical member being supported in contact with the set of rolling members for rolling motion around one or more selected axes through the center of the spherical member; and (c) a driving mechanism which controllably drives the spherical member in rotation around one or more ball axes in rolling contact with the set of rolling members.

Most preferably the controllably driven roller of a drive mechanism is connected to a control mechanism having a program for driving a driven roller such that the vehicle can travel in any predetermined path along the support surface.

Further according to the invention there is provided a robot arm comprising a housing having an opening in one end and a ball joint mounted in the opening of the arm housing. The ball joint of the robot arm comprises a spherical member mounted in the opening at the end of the arm housing, a spherical member mounting mechanism which includes a rolling member supported in contact with a first selected circle on the surface of the spherical member, the spherical member being disposed in said opening relative to the arm housing for rolling motion around multiple axes through the center of said spherical member; and a driving mechanism which controllably drives the spherical member in multiple axis rotation in rolling contact with the rolling member.

The driving mechanism of the robot ball joint may comprise a pair of cables each attached to the surface of the spherical member and a set of pulley wheels, the cables being tautly wound around a circumferential surface of the pulley wheels for drivable movement of the cables around the pulley wheels; and a motor driven mechanism which controllably drives the cables around the surfaces of the pulley wheels wherein the cables controllably rotate the spherical member around selected axes when the cables are controllably driven. Such a motor driven mechanism typically includes a pair of bidirectional drive motors each having a driven windlass drive shaft; each of the cables being wound around a separate one of the windlass drive shafts and supported by the pulley wheels such that the cables are tautly mounted in orthogonal relationship to each other; the cables being attached to the surface of the spherical member and the motors being simultaneously drivable in opposite directions such that the cables drive the spherical member back and forth through a predetermined direction of rotation.

BRIEF DESCRIPTION OF THE DRAWINGS

The invention is described in detail below with reference to exemplary embodiments shown in the drawings wherein.

Analogous elements among the figures are designated with the same reference numerals.

DETAILED DESCRIPTION OF PREFERRED EMBODIMENTS

Figure 1:
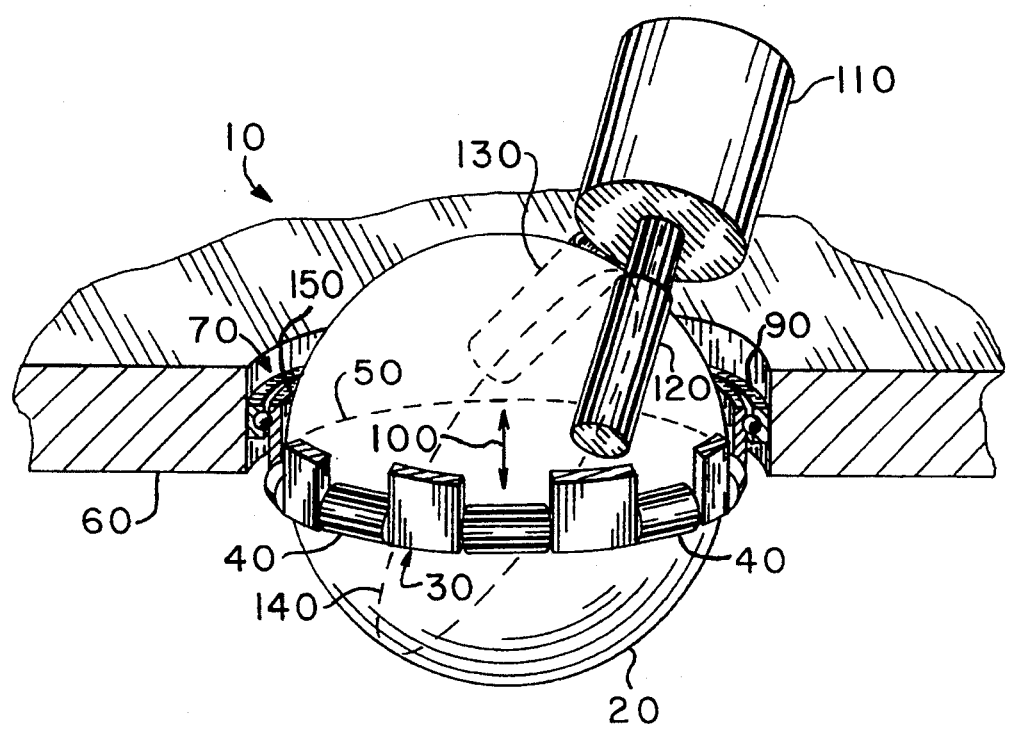
FIG. 1 is a schematic perspective view of a ball joint according to the invention showing a spherical ball member supported in a ring of rollers which are held in contact with and freely rotatable around a first great circle on the surface of the ball and a ball drive mechanism comprising a pair of drive rollers contacting the ball on a second great circle at two points on one side of the ball above the plane of the first great circle.

There is shown in FIG. 1 a generic ball joint assembly 10 according to the invention comprising a spherical ball 20 and a support ring 30 of support rollers 40 each of which contacts the surface of the ball 20 at a point on each roller 40 which is coplanar with a first great circle 50 on the surface of the ball 20. A great circle is any circle on the surface of a sphere which intersects at two points on a line which intersects the center of the sphere. The support rollers 40 are freely rotatable and provide support for positioning the ball 20 within the ring by their points of contact with the surface of the ball. Other freely rotatable mechanisms which provide a point contact with the surface of the ball 20 may alternatively be employed where such alternative mechanisms rotate by rolling motion on another surface and not by turning motion within or against another non-moving, fixed surface or medium such as would occur with a ball bearing. The ring 30 is mounted on a platform, housing or the like 60 via a circular ball bearing mechanism 70. The ring 30 is attached to the inner race 150 of the circular bearing mechanism 70 and the outer race 90 of the circular bearing 70 is attached to the platform 60 such that the ring 30 is freely rotatable around its central axis 100 which intersects the center of the ball 20. As shown in FIG. 1, the inner race 150 of the bearing 70 is connected to the ring 30.

A mechanism for controllably driving the ball in two degrees of freedom is provided. As shown in FIGS. 1-4, the drive mechanism includes a motor 110 which rotatably drives at least one of two rollers 120, 130 (120 as shown in FIG. 1). A single point on the surface of the two drive rollers 120, 130 each contact the surface of the ball 20 and the rotation axes of the rollers are mounted such that the contact points of the rollers 120, 130 contact a second great circle 140 on the ball surface. The second great circle 140 intersects the first great circle 50 at angle greater than 0 and less than, or equal to, 90 degrees.

Figure 3:
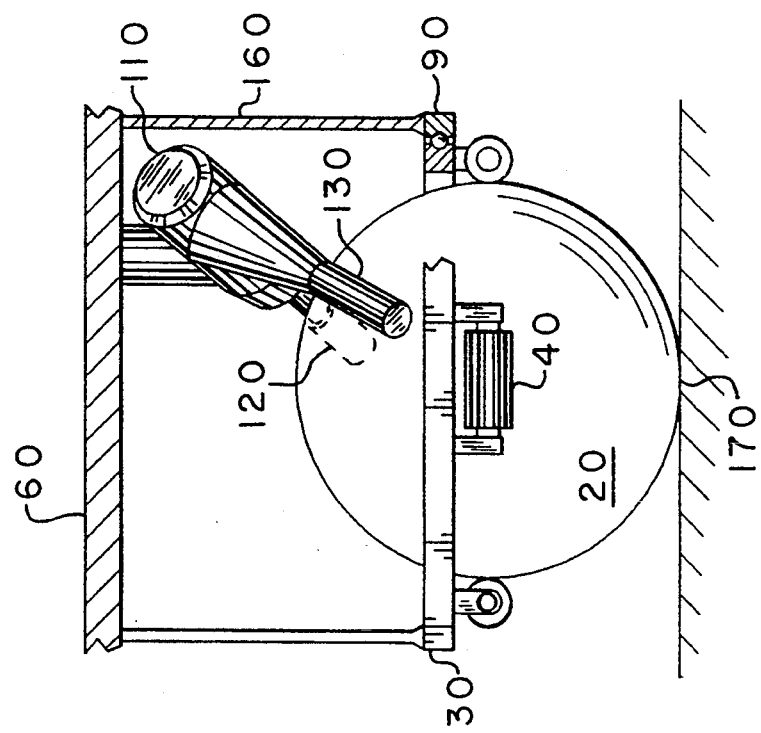
FIG. 3 is a side view of the ball joint shown in FIG. 2.
Figure 2:
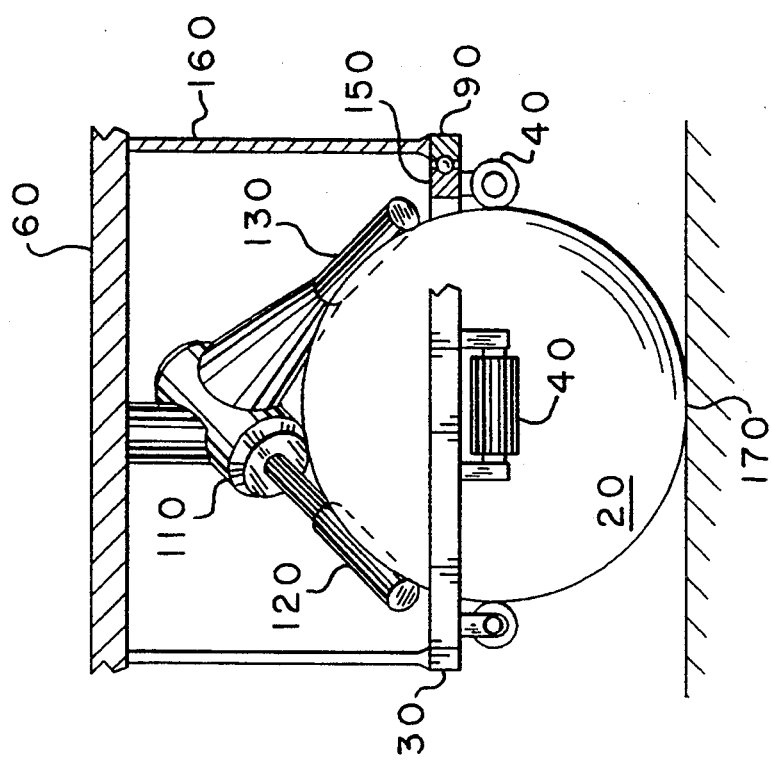
FIG. 2 is a front view of a ball joint similar to the ball joint of FIG. 1 mounted on a platform.

One alternative exemplary embodiment for mounting the drive motor 110 and support ring 30 to a platform 60 is shown in the front and side views of FIGS. 2, 3. As shown, the outer race 90 of the ring 30 is attached to the bottom end of arms 160 which are attached to the platform 60.

Figure 4:
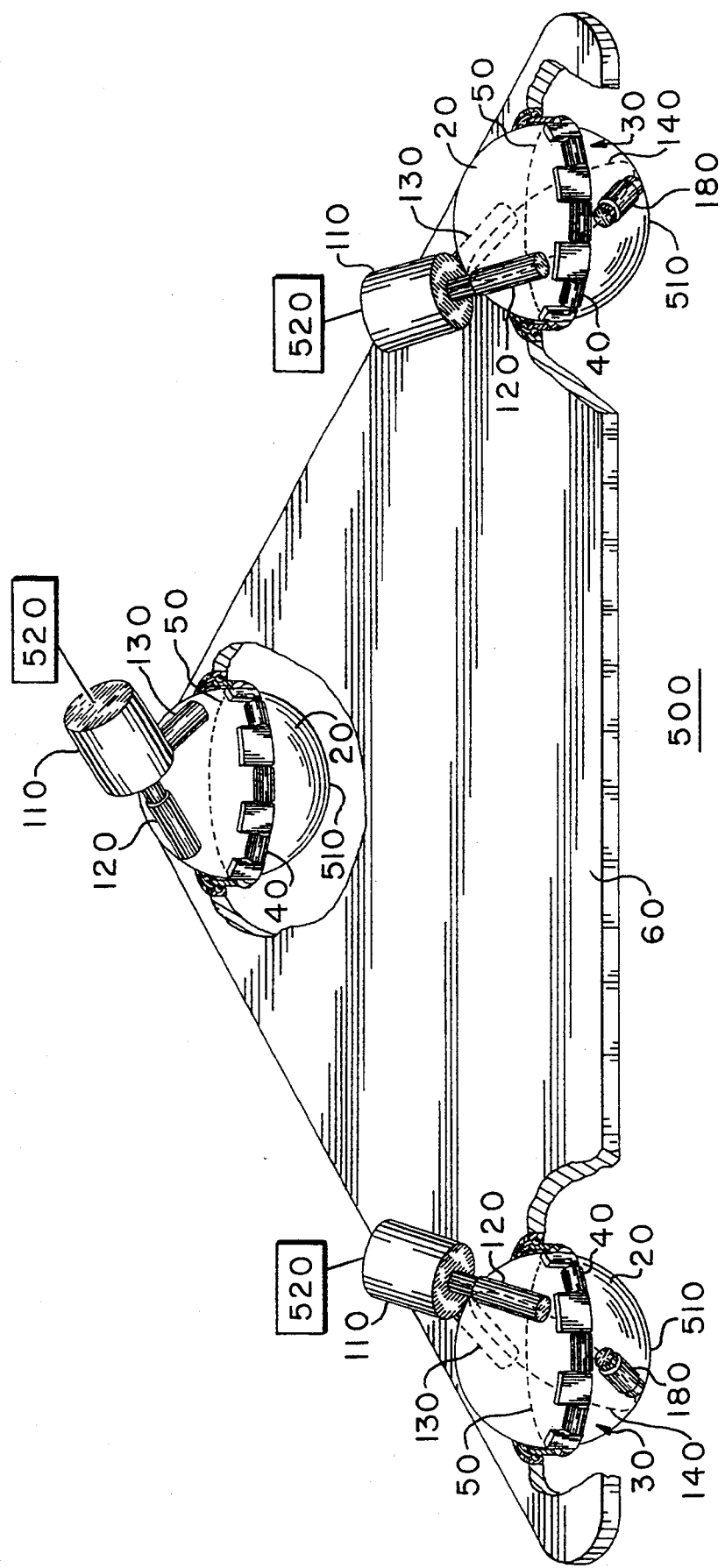
FIG. 4 is a schematic perspective view of a vehicle having three ball joints mounted on a platform.

FIG. 4 shows a vehicle having a vehicle platform 60 on which is mounted three separate ball joints at the corners of a triangle. In the embodiments shown in FIGS. 1-3 the ball 20 is not captured within the support ring but relies solely on contact with the ground 170 to maintain the ball within the ring 30. The two contact points with drive rollers 120 and 130 together with the contact of the ball 20 with the ground maintain the ball 20 within ring 30. However when the platform 60 is raised above the ground 70, the ball 20 is free from remaining within the ring 30.

In the embodiment shown in FIG. 4 the ball is captured within ring 30 by the rollers 120, 130 and a support roller 180 which contacts the ball 20 at a point on the circle 140 below the first great circle 50 relative to the points of contact with rollers 120, 130 which are above the first great circle 50. The term "captured" as used herein means that the ball 20 is held within the ring 30 such that the support rollers 40 are all maintained in contact with a point around the first great circle 50. Most preferably in the FIG. 4 embodiment, the axis of the support roller 180 is coplanar with the circle 140 such the support roller 180 places a minimum of restriction on the rotational degrees of freedom of the ball 20.

As can be imagined readily in the embodiments shown in FIGS. 1-4, rotation of roller 120 about its own axis causes the ball 20 to rotate about the axis which passes through the center of the ball 20 and which is parallel to the axis of roller 120. Similarly, rotation of roller 130 about its own axis causes the ball 20 to rotate about the axis which passes through the center of the ball 20 and which is parallel to the axis of roller 130. The rotations of rollers 120 and 130 are independent of one another and hence the ball 20 can rotate with two degrees of freedom relative to platform 60. The ball 20 can rotate about any axis through its center which also lies in the plane containing the axes of rollers 120 and 130, with that axis and the speed of rotation around that axis being determined by the speed of rotation of rollers 120 and 130. Note that the rotations of additional rollers 40, which are in frictional contact with the surface of the ball 20, are fully determined by the rotations of rollers 120 and 130, hence the ball 20 can rotate relative to the platform 60 with two, and only two, degrees of freedom.

FIGS. 1-4 illustrate embodiments where roller 120 is driven by motor 110 such that rotation of the ball 20 about the axis which passes through the center of the ball 20 and which is parallel to the axis of roller 120 is controlled. The rotations of all other rollers and of bearing inner race 150 are not controlled and hence the rotation of the spherical ball about the axis which passes through the center of the ball 20 and the point of contact with roller 120 is essentially uncontrolled for such rotation causes twisting of the ball 20 about its point of contact with roller 120 and is independent from the rotation of roller 120. In such embodiments the ball 20 has one active degree of freedom and one passive degree of freedom relative to platform 60. Further potentially useful embodiments may include no motors or actuators, in which case the ball 20 will possess two passive degrees of freedom relative to platform 60. Alternative potentially useful embodiments may incorporate two motors or actuators to control the rotation of the spherical ball about two distinct axes through the center of the spherical ball, for instance motors may be connected to rollers 120 and 130. In this case the ball will possess two active degrees of freedom relative to platform 60 and the independent motion of the two motors will fully determine the motion of the ball relative to platform 60. Further actuators may be implemented to drive the ball through further rollers in frictional contact with the surface of the ball, however the speed of these additional motors must be consistent with the speed of the first two motors, and hence such a set of motors is said to be redundant.

Figure 5:
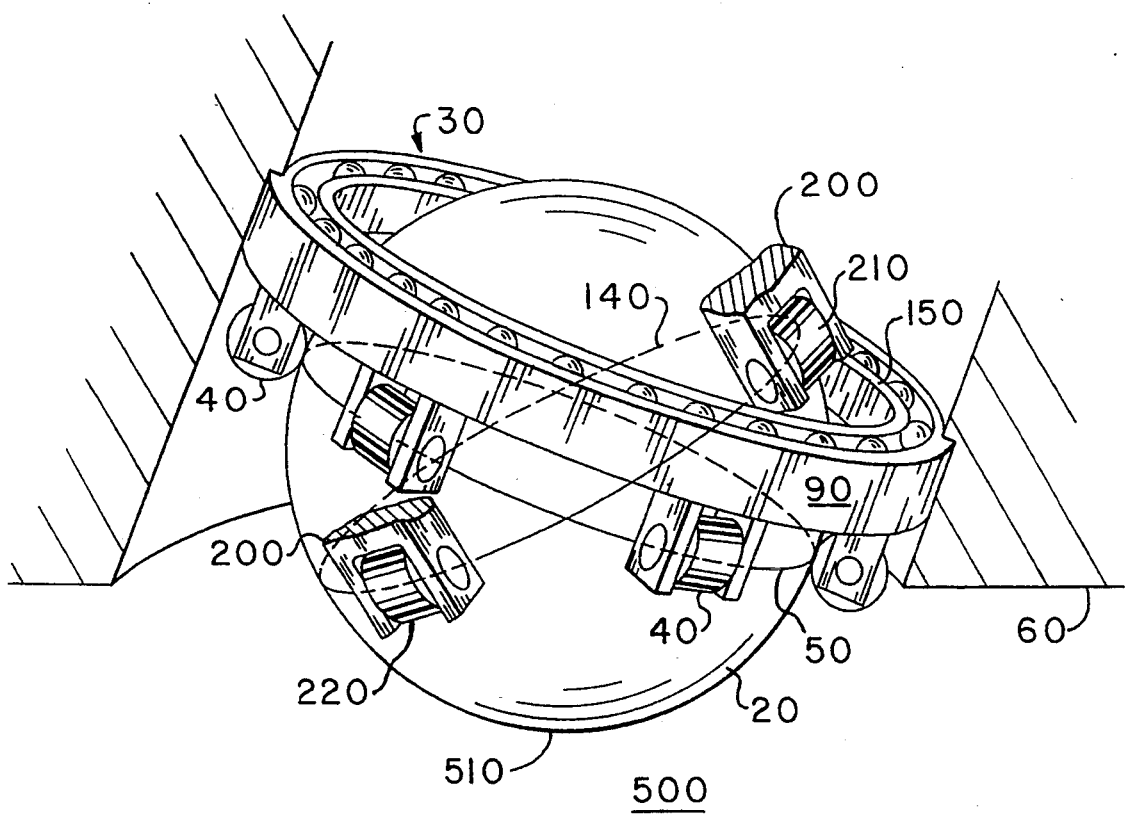
FIG. 5 is a side view of a ball joint mounted in a platform housing showing a capture roller arrangement wherein capture rollers contact the surface of the ball at two points on opposite sides of a great circle around which a rotatable ring of support rollers extend.
Figure 6:
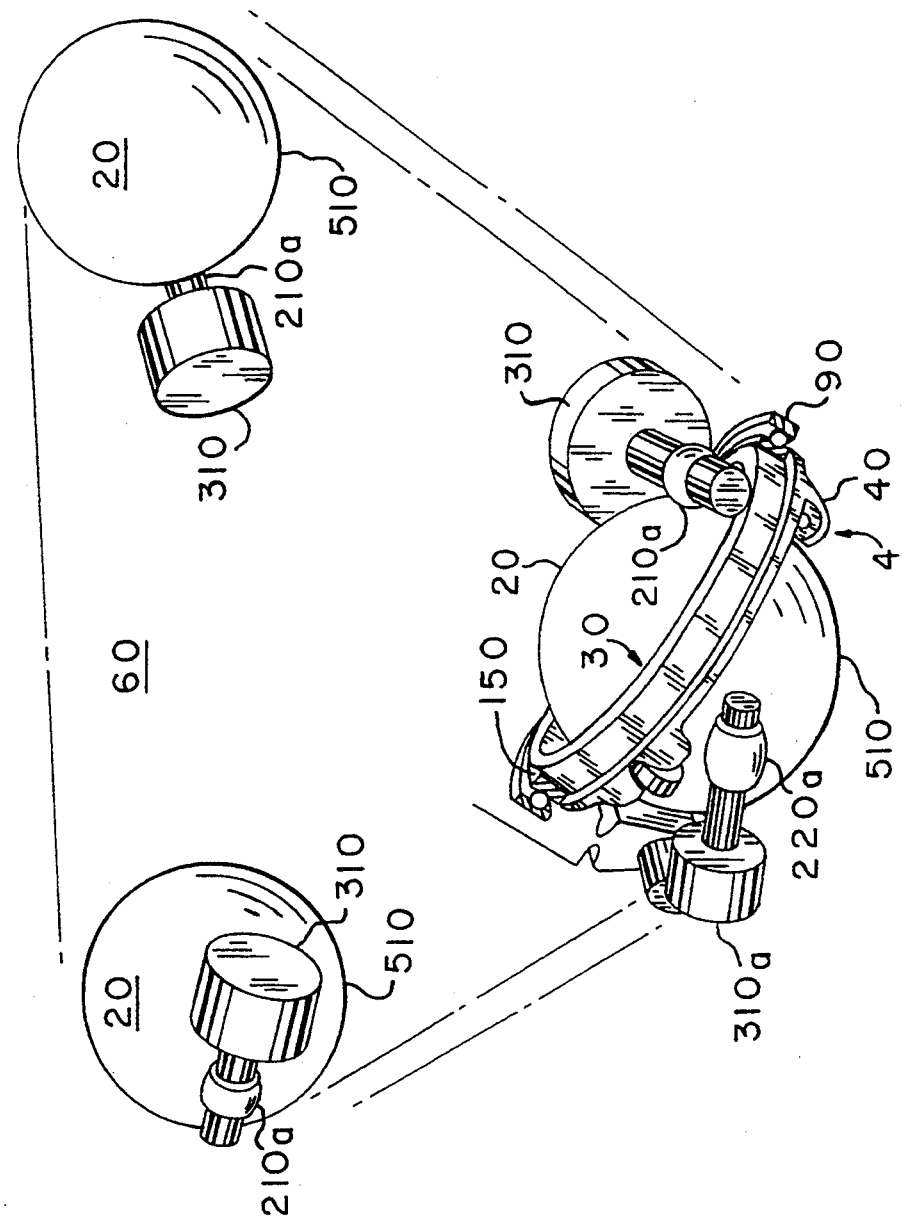
FIG. 6 is a schematic perspective view of an omnidirectional vehicle having three ball joints 5 showing an alternative exemplary configuration for drive rollers.

In a vehicle having three ball joints mounted at the corners of a triangle, such as in the embodiment of vehicle 60, FIG. 4, each ball 20 possesses two rotational degrees of freedom relative to vehicle 60 while simultaneously being free to rotate relative to the substantially planar support surface 500 about an axis which passes through the point of contact 510 between the ball 20 and the surface 500 and which is perpendicular to the surface 500. Consequently, such a vehicle 60 is afforded three degrees of freedom relative to the substantially planar support surface 500, i.e. independent translation in two orthogonal directions on the substantially planar surface and rotation about an axis perpendicular to the substantially planar surface. Vehicle 60, FIG. 4, may be derivable in any selected path on a surface 500 on which the balls 20 all make a point contact 510 by providing a suitable drive program 520 which simultaneously controls the rotational drive rollers 120 (and/or 130) by motors 110. The details of how ball joints may be driven in the context of an omnidirectional vehicle such as in FIGS. 4 and 6 is described below with reference to FIGS. 6, 12, 13, 14 and 15. FIG. 5 illustrates an embodiment of the invention where a pair of capture rollers 210, 220 which are not driven are provided solely for purposes of capturing the ball 20 within the center of the ring 30 of support rollers 40. Rollers 210 and 220 are freely rotatable around their axles which are rotatably mounted in arms 200. Roller 210 makes a point contact with the surface of the ball 20 above (on one side of) the plane of great circle 50 and roller 220 makes a point contact with the surface of the ball 20 below (on the other side of) the plane of the great circle 50. The point contacts of rollers 210, 220 with the ball 20 surface thus oppose each other on opposite sides of the great circle 50 and the ball 20 is captured within the ring 30 by the combination of the point contacts of the ring 30 of rollers 40 and the opposing upward and downward force point contacts of rollers 210 and 220. Inasmuch as none of the rollers 40, 210, 220 are driven but rather freely rotatable, the ball joint assembly of FIG. 5 may act as a caster with the ball 20 being freely rotatable relative to platform 60 in two degrees of freedom, specifically, without restriction on the rotation of the ball 20 about any axes through the center of ball 20 which are coplanar with circle 140. As shown, the axles or axes of rotation of rollers 40 are coplanar with great circle 50 and the axes of rotation of rollers 210, 220 are coplanar with another selected circle 140 on the surface of ball 20. Circle 140 is preferably a second great circle on the surface of ball 20 so as to minimize restriction on the potential rotational degrees of freedom of the ball 20. As shown in FIG. 5, the outer race 90 of the ring 30 is attached to a platform (or vehicle) 60 such that points 510 on the bottom of the ball 20 surfaces may make contact with a surface 500 (e.g., the ground) on which the platform 60 is intended to be translationally movable. The platform 60 and ball 20 can also rotate, in unison, about the point contact 510 between the ball 20 and the surface 500 affording the platform 60 three degrees of freedom relative to the ground 500.

Figure 8:
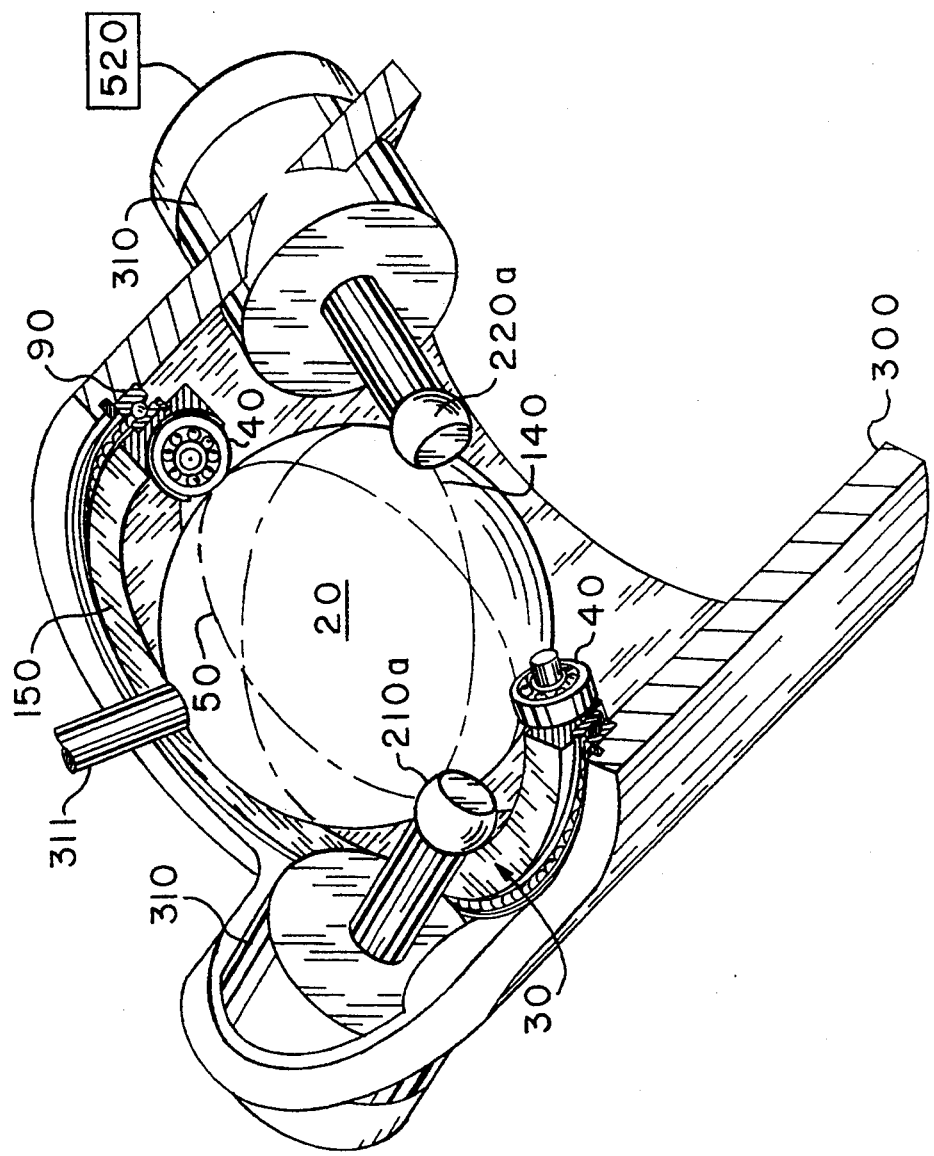
FIG. 8 is a schematic perspective view of an alternative ball joint assembly mounted in the end of a robot arm housing having an alternative ball drive mechanism.

FIGS. 6 and 8 illustrate an embodiment where a drive roller system comprises two rollers 210, 220 (one or both of which may be driven) mounted on arms 200 such that a point on the surface of one drive roller 210 contacts the ball surface above the plane of the great circle 50 and a point on the surface of another roller 220 contacts the ball surface below the plane of the great circle 50. As described with reference to the FIG. 5 embodiment, because the rollers 210, 220 contact the ball surface above and below the first great circle 50 defined by the ring of rollers 40, the ball 20 is captured within the ring 30 thereby obviating the need for an additional capture support roller such as roller 180, FIG. 4.

In the FIGS. 6 and 8 embodiments the rollers 210, 220 are configured as a sleeve 210a, 220a mounted on an axle which is directly connected to motor(s) 310. The sleeves 210a, 220a have a curved spherical-like outer surface which better ensures a point contact with the ball surface as the sleeves are rotated around the axles on which they are mounted. As can be readily imagined, the sleeves 210a, 220a mounted on the axles function in the same manner as the rollers 120, 130 described above with reference to FIGS. 1-4.

The axes of the axles of sleeves 210a, 220a, FIGS. 6, 8 are coplanar with a selected circle 140 which, again, is preferably a second great circle on the surface of ball 20 so as to minimize restriction on the rotational degrees of freedom of the ball 20.

Figure 7:
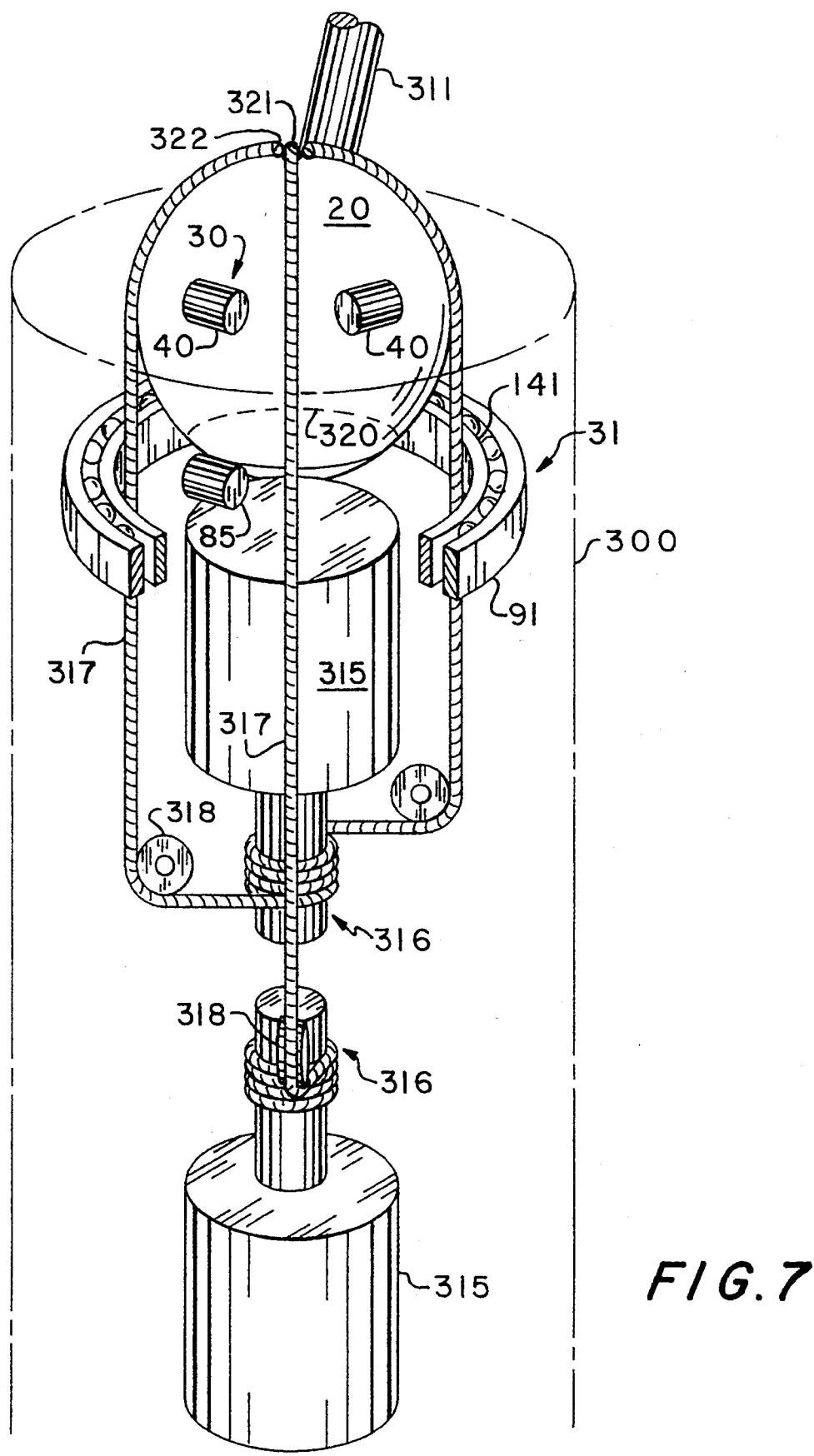
FIG. 7 is a schematic perspective view of a ball joint according to the invention mounted in a robot arm having a cable/tendon and driven windlass shaft ball drive mechanism.

FIG. 7 shows in schematic form a robot arm having a ball joint mounted in or at the open end of a robot arm housing 300.

A mechanical manipulating element 311 such as an arm having a tool such as a gripper, a welding mechanism or the like for performing certain manipulations is attached to and protrudes from the surface of ball 20. The ball joint is mounted in the arm housing 300 such that the manipulating element 311 extends outside of the housing 300 and such that when the ball 20 is controllably driven, the element 311 can be moved in a predetermined arc or arcs outside the housing 300. In the FIG. 7 embodiment, the ball 20 is supported by a support roller 85 which makes point contact with a selected circle 320 on the ball surface which is not a great circle. The roller 85 is supported on a ring 31 which has an outer race 91 attached to the housing 300 for supporting the ball in the open end of the arm housing 300 and an inner race 141 to which the roller 85 is rigidly attached, the inner race 141 allowing the roller 85 to be freely rotatable around the center axis of the non-great circle 320. Another ring 30 of at least three support rollers 40 (shown schematically) is provided with the axles of rollers 40 being rigidly attached to housing 300 such that their axes are coplanar with a great circle (not shown) and the ball 20 remains supported in the selected position at the open end of the robot arm housing 300.

In the FIG. 7 embodiment, the drive system comprises a pair of drive motors 315 each having a windlass shaft 316 around which a pair of cables 317 are wound. The cables are supported by pulleys 318 such that the cables or tendons 317 can be simultaneously driven around shafts 316 and pulleys 318 in a back and forth manner. One end of the cables are attached to selected points 321, 322 on the surface of the ball 20 and the motors 315 and associated pulleys 318 are connected to the housing 300 such that the cables 317 are tautly strung around the shafts 316, pulleys 318 and the surface of the ball 20.

The pulleys 318 are mounted to the housing 300 and the cables are attached to the surface of the ball 20 at points 321, 322 such that the sections of cable 317 between the pulleys 318 and the surface of the ball 20 are perpendicular to the plane containing the axes of rollers 40 and are equally spaced around the surface of the ball i.e., at 90 degree intervals. As such, driving the first motor 315 will drive the corresponding first cable 317 thus defining the rotation of the ball 20 about an axis through its center which is perpendicular to the plane containing the sections of the first cable 317 which pass between the pulleys 318 and the surface of the ball 20. Similarly, driving the second motor 315 will drive the corresponding second cable 317 thus defining the rotation of ball 20 about an axis through its center which is perpendicular to the plane containing the sections of the second cable 317 which pass between the pulleys 318 and the surface of the ball 20. The two motors 315 may be driven simultaneously and independently in order to control the rotation of the ball 20, relative to the housing 300, about any desired axis through its center which lies in a plane containing the axes of rollers 40 i.e., with two degrees of freedom.

As can be readily imagined, in the FIG. 7 embodiment, the ball 20 is captured and maintained in the position shown by the combination of the ring of rollers 40, the support roller 85 and the tautly strung cables 317.

FIG. 8 shows an alternative ball joint (similar to the ball joint shown in FIG. 6) for mounting in the open end of a robot arm housing 300 where the ball 20 is captured and maintained in the position shown, by the ring 30 of rollers 40 in contact with great circle 50 and the drive system rollers 210a, 220a which are in contact with separate points on another great circle 140 one above and one below the plane of the great circle 50. As described above with reference to the embodiments of the ball joints shown in FIGS. 1–4, 6, the ball joint shown in FIG. 8 (and FIG. 6) is drivable by motors 310 such that ball 20 rotates, relative to housing 300 (or platform 60), about any desired axis through its center which lies in the plane containing the axes of rollers 210 and 220. The ball 20, FIG. 8 (and FIG. 6) is thus drivable with two degrees of freedom relative to housing 300 (platform 60). A mechanical manipulating element 311 is also attached to the surface of ball 20 which faces the open end of housing 300, FIG. 8.

In all of the embodiments shown in FIGS. 1–6, 8 where drive rollers 120 (130), FIGS. 1–4 or drive rollers 210a, 220a, FIGS. 6, 8 or passive capture rollers 210, 220, FIG. 5, are mounted such that their rotational axes are coplanar with another circle 140 on the ball surface, the circle 140 is preferably selected such that the plane in which circle 140 is disposed forms an angle of greater than 0 and less than or equal to 90 degrees with the plane in which the great circle 50 is disposed (most preferably between about 10 and about 45 degrees). By providing such a mounting arrangement, a substantial portion of the ball surface is exposed and can be reserved for engagement with another surface (e.g., the ground) or the manipulating element 311, FIG. 8, can be moved without undue restriction from the motors 310 or arms 200 on which the rollers 120 (130), 210, 220, 210a, 220a must be mounted.

Figure 9:
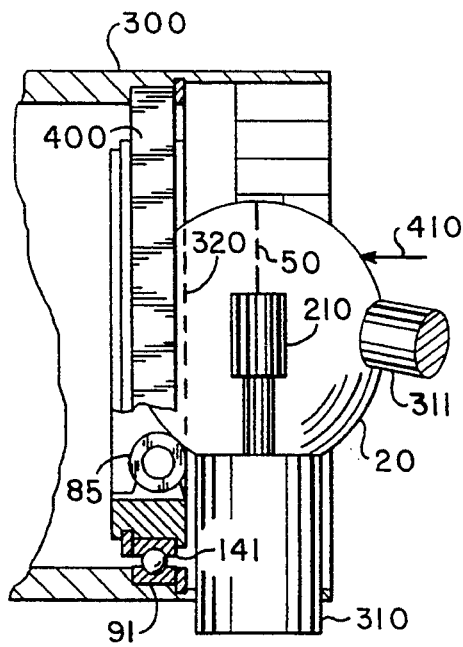
FIG. 9 is a partially sectioned, schematic side view of another alternative embodiment of a ball joint assembly mounted in the end of a robot arm housing having a single support roller mounted in contact with the ball for free rotation around a circle on the surface of the ball which is not a great circle.
Figure 10:
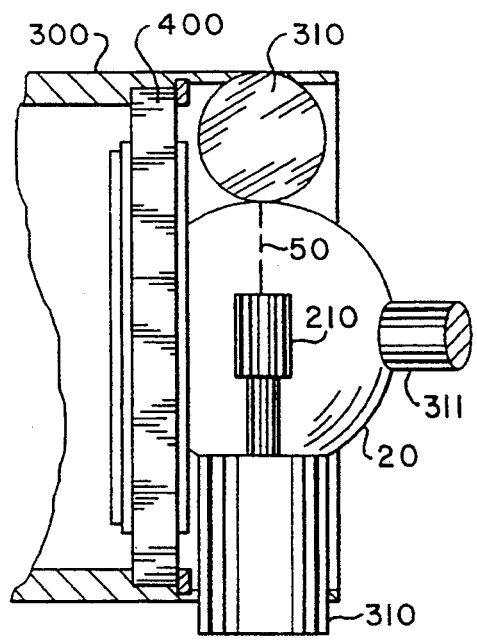
FIG. 10 is a side view similar to the side view of FIG. 9 without sectioning.
Figure 11:
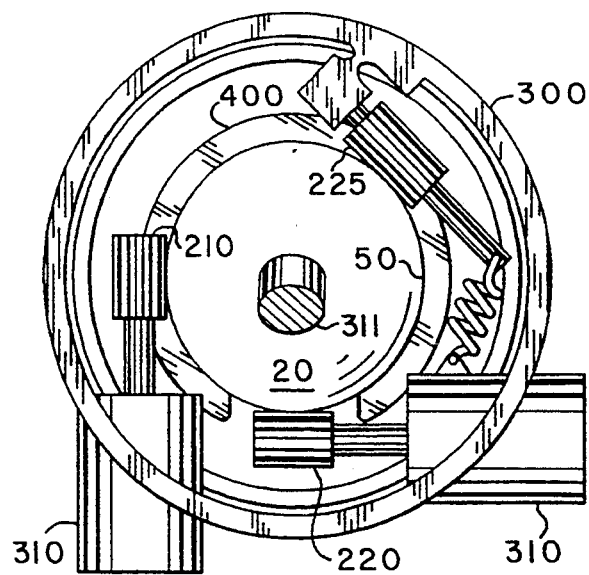
FIG. 11 is a top view of the apparatus shown in FIGS. 9 and 10.

Another alternative ball joint assembly for use in a robot arm housing 300 is shown in FIGS. 9–11. In the FIGS. 9–11 embodiment, a support ring 400 having a single support roller 85 in point contact with the surface of ball 20 is provided. The support roller 85 is attached to the inner race 141 of ring 400 and the outer race 91 of ring 400 is attached to housing 300. The outer race 91 is attached to housing 300 such that the roller is rotatable around a non-great circle 320 on the ball surface. In the FIGS. 9–11 embodiment the drive system rollers 210, 220, 225 are in point contact with a great circle 50 on the ball surface. As shown, at least three drive system rollers 210, 220, 225 are provided to maintain the ball 20 in the position shown in FIGS. 9–11. The point contact of the three rollers 210, 220, 225 on great circle 50 together with the point of contact of roller 85 on the non-great circle 320 capture the ball 20 in the position shown when there is an external force applied to the surface of the ball and the component of this force perpendicular to the plane of circle 50, 410, acts to push ball 20 toward roller 85. Such a force may be applied via manipulating element 311 or alternatively a capture support could be provided to exert the vector force 410 for capturing the ball 20.

As shown in FIGS. 9–11, the ball 20 is mounted in contact with rollers 85, 210, 220, 225 such that the ball 20 is mounted in a stable position in or at the open end of the arm housing 300 with one-half of the ball surface facing the open end of the housing 300. A mechanical manipulating element 311, FIGS. 9–11, is attached to the outwardly facing ball surface similar to the element 311 shown in FIGS. 7, 8. As described with reference to FIGS. 1–6, 8, ball 20 may be driven such that it rotates, relative to housing 300, about any desired axis which passes through the center of the ball and which also lies in the plane of circle 50 i.e., in two degrees of freedom.

Figures 12, 13:
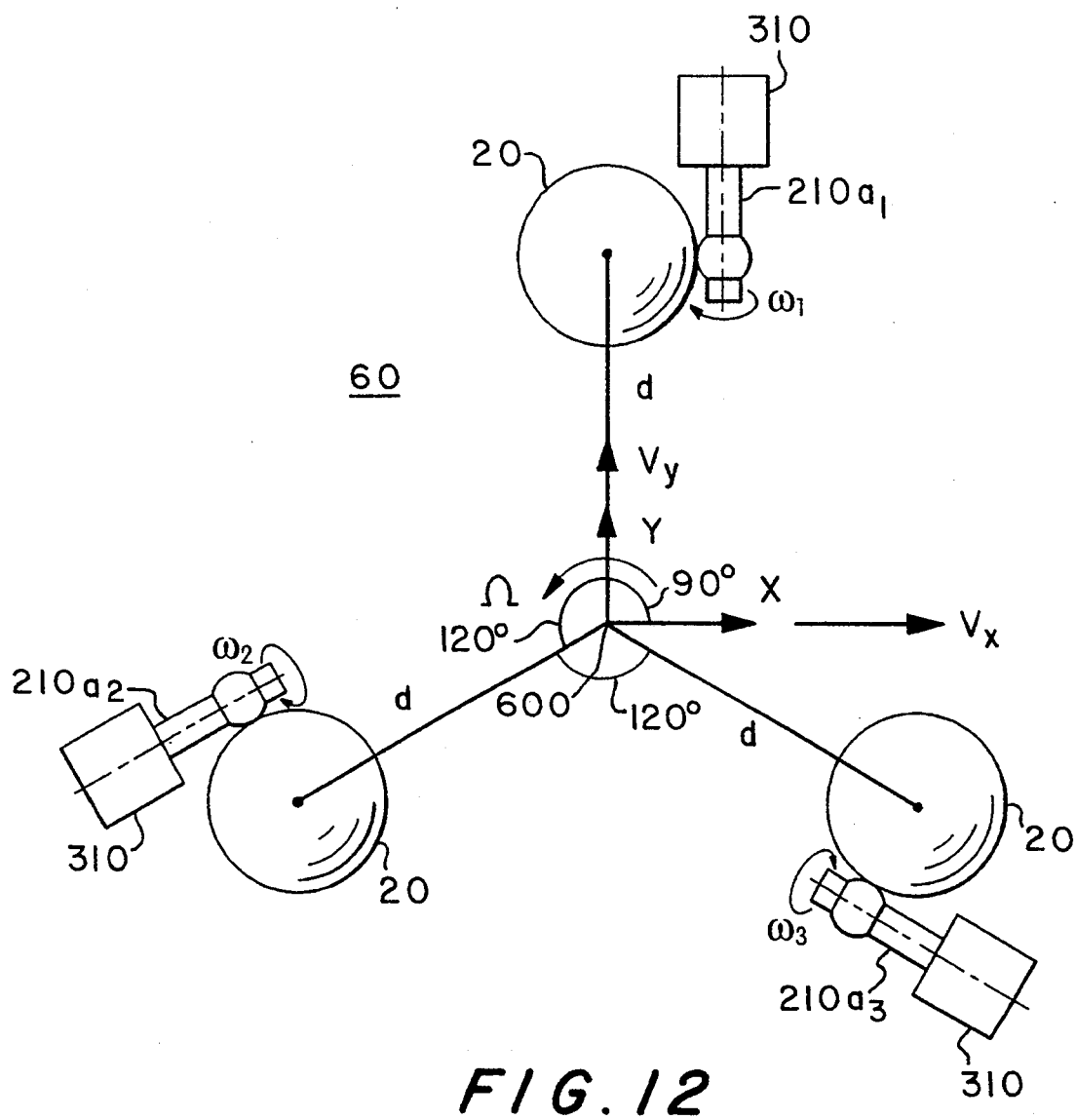
FIG. 12 is a schematic top plan view of the FIG. 6 omnidirectional vehicle defining a frame of reference for various drive control program inputs.
FIG. 13 is an exemplary formula for use in computing certain output signals based on certain selected inputs for controlling the navigation of the FIG. 6 apparatus.

An exemplary system for controllably driving the ball joints of an omnidirectional vehicle such as schematically shown in FIG. 6 is described with reference to FIGS. 12, 13, 14, 15. FIG. 12 is a schematic top plan view of the omnidirectional vehicle of FIG. 6 in which only one non-ring roller 210a per ball 20 is driven by, for example, a D.C. motor 310. An encoder 310a, FIG. 6, may be provided in connection with rollers 220a for measuring or monitoring the rotation of rollers 220a and thus provide information used for navigation of the omnidirectional vehicle. As described above, the axes of drive rollers 210a are coplanar with the circle 140.

In the FIG. 12 top plan view of the FIG. 6 apparatus, it can be seen that the three balls 20 are mounted to the platform 60 such that the centers of the balls 20 form an equilateral triangle. FIG. 12 defines a frame of reference for the following described drive program. The platform datum is the centroid point 600 of the equilateral triangle.

The distance from the center of a ball 20 to the datum point 600 is d, the radius of the rollers 210a is r, Vx is the component of platform 60 velocity relative to the ground, along the X axis as depicted in FIG. 12, Vy is the component of platform 60 velocity, relative to the ground, along the Y axis as depicted in FIG. 12, $\Omega$ is the angular velocity of the platform relative to ground, $\omega_1$ is the angular velocity of roller $210a_1$, $\omega_2$ is the angular velocity of roller $210a_2$ and $\omega_3$ is the angular velocity of roller $210a_3$.

Figure 14:
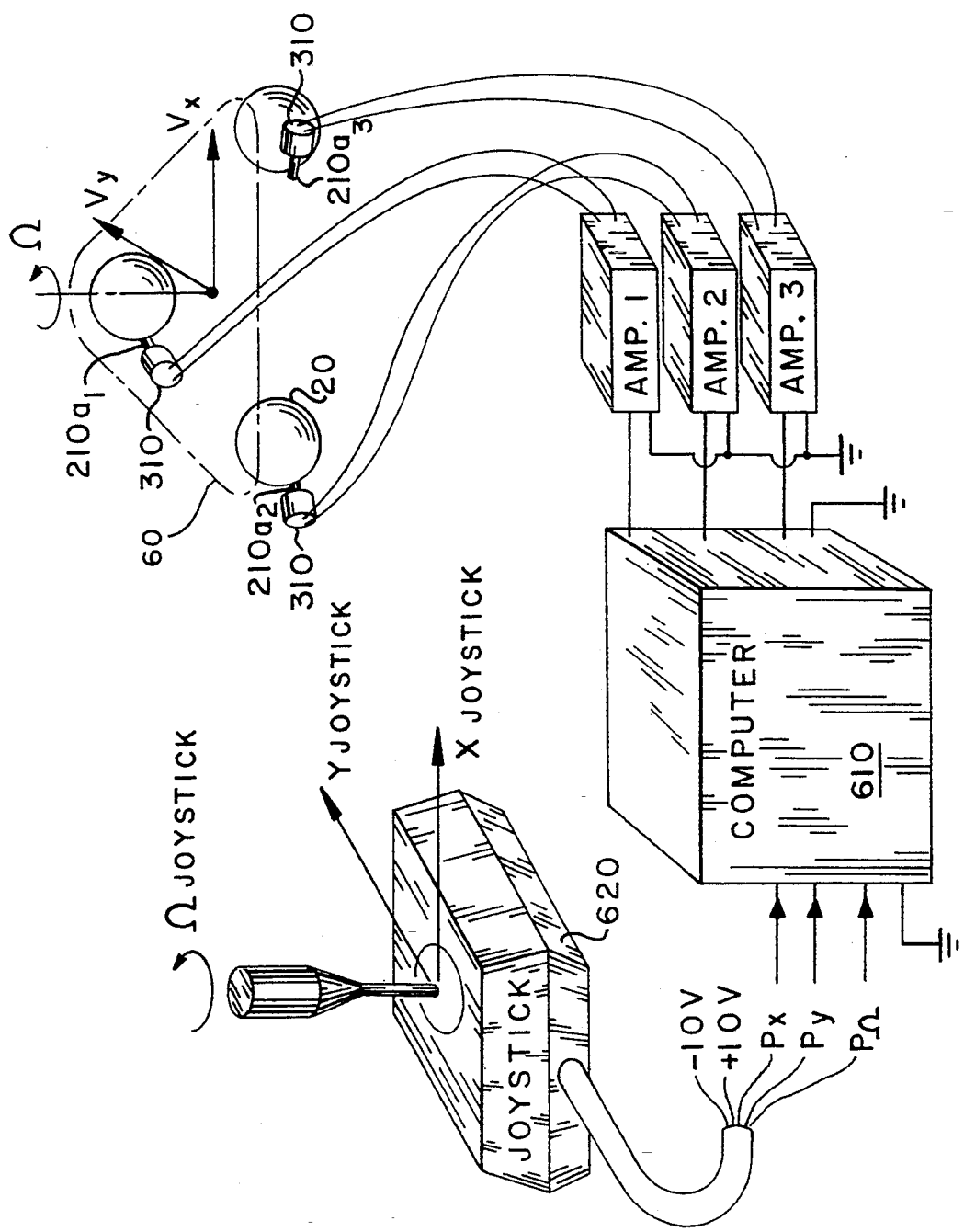
FIG. 14 is a schematic overview of a drive control apparatus for inputting navigation parameters to a processing computer connected to the motor drive units of the FIG. 6 apparatus; and, FIG. 15 is a further schematic overview of the FIG. 14 control assembly showing additional details of the joystick/computer/drive motor interconnections and how the various rotational velocities of the drive rollers are computed and translated by the control assembly into rotational velocity control signals sent to the drive motors.
Figure 15:
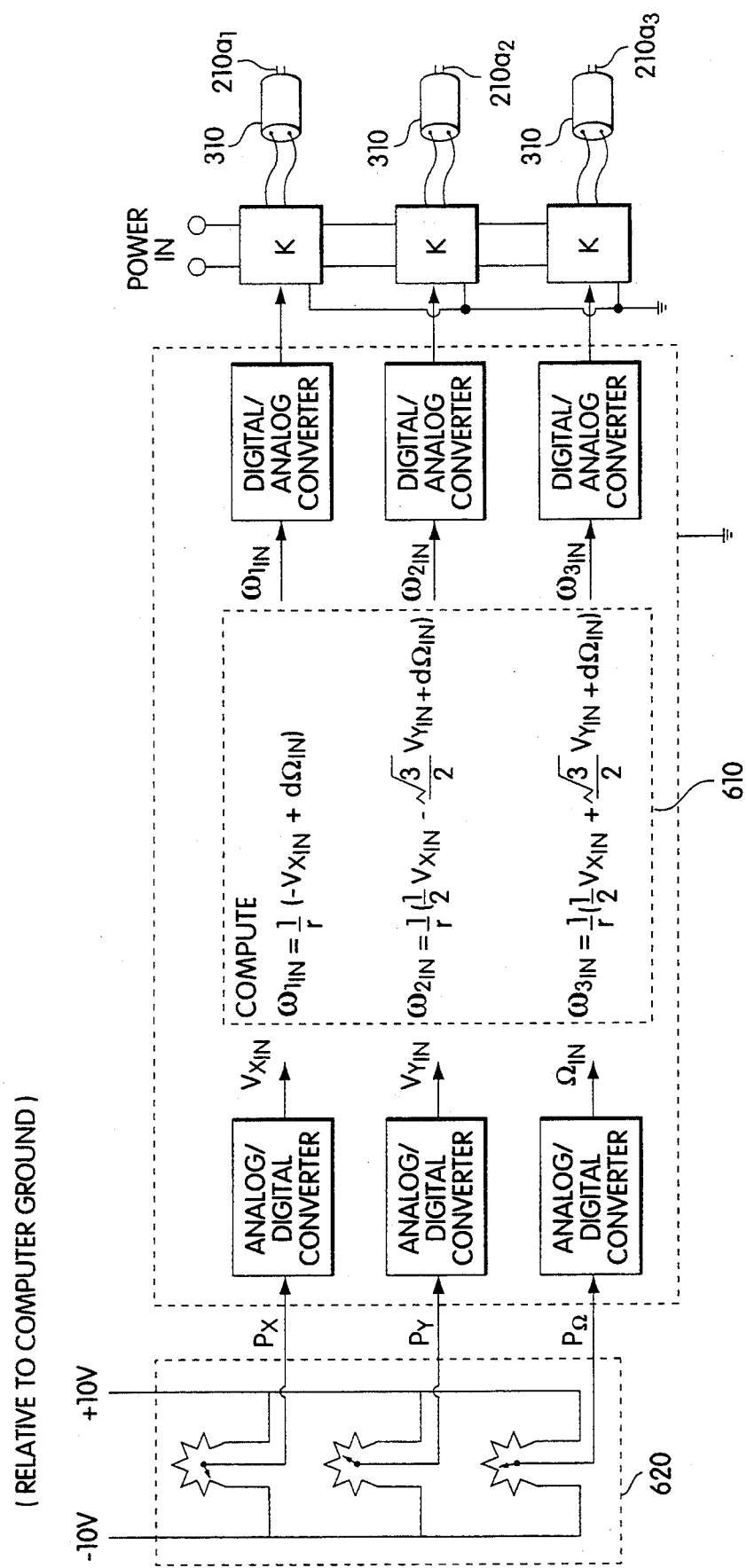

Navigation of the platform 60 of FIG. 6 can be controlled using the parameters as defined above in a program employing the formula set forth in FIG. 13. With reference to FIG. 14, the formula of FIG. 13 is provided in a computer 610 which is connected in a conventional manner to a joystick mechanism 620 by which the desired $\Omega$, Vx and Vy components of the formula can be input to the operation program in the computer 610.

Px, Py and P$\Omega$ are voltages generated by the joystick 620 and input into the computer which are proportional to the position of the joystick in the X direction, Y direction and angular $\Omega$ direction respectively, the voltage inputs ranging, for example, between $-10$ and $+10$ volts. As shown in FIG. 14, the computer 610 is connected in a conventional manner, for example through linear amplifiers 630 to the motors 310 which drive rollers 210a. As shown schematically in FIG. 14 with respect to one ball 20 and associated drive roller 210a₁, the desired $\Omega$, Vx and Vy parameters input via the joystick 620 are executed with respect to each ball 20 and its associated drive roller to effect controlled navigation of the platform 60. Further details of how the connected joystick 620, computer 610, amplifiers 630 and motors compute and translate the various $\omega_1$, $\omega_2$ and $\omega_3$ components for each ball 20 into velocity components are shown. In practice, the speeds of the various motors 310 may be measured in order to control the speeds more accurately.

As can be readily imagined, the drive rollers of any ball joint in any embodiment or application may be controllably driven according to a predetermined formula/program which is specifically designed to direct a controlled rotational movement of a ball 20 which is peculiar to the particular application in which a ball joint is to be employed and the particular embodiment of the ball joint to be employed. Element 520 shown in FIGS. 4, 8, 11 represents a generic ball drive control assembly which includes a predetermined program for directing the drive of a drive motor 310. In the case of a robot or other application, the programmed drive of the drive rollers or other drive mechanism may be automatically initiated in response to signals obtained from sensor mechanisms, timing mechanisms and the like for purposes of automatic operation.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An assembly for mounting a ball for rotation around multiple axes comprising:
   a base member;
   a spherical member;
   a ring of at least three rolling members mounted around the spherical member such that a point on a rolling surface of each of the at least three rolling members contacts a point on a first great circle on the surface of the spherical member;
   the ring of rolling members being freely rotatable around the axis of the first great circle;
   at least two capture rolling members, one capture rolling member mounted such that a rolling surface of the one capture rolling member is in contact with a point on the surface of the spherical member above the plane of the first great circle and another capture rolling member being mounted such that a rolling surface of said another roller member is in contact with a point below the plane of the first circle.

2. The assembly for mounting a ball for rotation around multiple axes of claim 1 wherein each of the at least three rolling members comprise a roller rotatable around an axis, the rotation axis of each of the at least three rolling members being coplanar with the first great circle.

3. The assembly for mounting a ball for rotation around multiple axes of claim 1 wherein each of the capture rolling members comprise a roller rotatable around an axis, the rotation axis of each of the capture rollers being coplanar with a second circle on the surface of the spherical member.

4. The assembly for mounting a ball for rotation around multiple axes of claim 3 wherein each of the at least three rolling members comprise a roller rotatable around an axis, the rotation axis of each of the at least three rolling members being coplanar with the first great circle.

5. An assembly for mounting a ball for rotation around multiple axes comprising:
   a base member;
   a spherical member;
   a ring of at least three rolling members mounted around the spherical member such that a point on a rolling surface of each of the at least three rolling members contacts a point on a first great circle on the surface of the spherical member;
   the ring of rolling members being freely rotatable around the axis of the first great circle;
   at least two capture rolling members, one capture rolling member mounted such that a rolling surface of the one capture rolling member is in contact with a point on the surface of the spherical member above the plane of the first great circle and another capture rolling member being mounted such that a rolling surface of said another rolling member is in contact with a point below the plane of the first circle wherein each of the capture rolling members comprise a roller rotatable around an axis, the rotation axis of each of the capture rollers being coplanar with a second great circle on the surface of the spherical member.

6. The assembly for mounting a ball for rotation around multiple axes of claim 5 wherein the first great circle and the second great circle are disposed at an acute angle relative to each other.

7. The assembly for mounting a ball for rotation around multiple axes of claim 6 wherein the first great circle and the second great circle are disposed at angle of between 15 and 60 degrees relative to each other.

8. An assembly for mounting a ball for rotation around multiple axes comprising:
   a base member;
   a spherical member;
   a ring of at least three rolling members mounted around the spherical member such that a point on a rolling surface of each of the at least three rolling members contacts a point on a first great circle on the surface of the spherical member;
   the ring of rolling members being freely rotatable around an axis through the center of the spherical member, the rotation axis of the ring of rolling members not being coplanar with the first great circle;
   at least two rolling members, mounted such that a point on a rolling surface of the at least two rolling members contacts a point on a second great circle on the surface of the spherical member.

9. The assembly for mounting a ball for rotation around multiple axes of claim 8 wherein each of the at least three rolling members comprise a roller rotatable around an axis, the rotation axis of each of the at least three rolling members being coplanar with the first great circle.

10. The assembly for mounting a ball for rotation around multiple axes of claim 8 wherein each of the at least two rolling members comprise a roller rotatable around an axis, the rotation axis of each of the at least two rolling members being coplanar with the second great circle.

11. The assembly for mounting a ball for rotation around multiple axes of claim 8 wherein the first great circle and the second great circle are disposed at an acute angle relative to each other.

12. The assembly for mounting a ball for rotation around multiple axes of claim 11 wherein the first great circle and the second great circle are disposed at an angle of between 15 and 60 degrees relative to each other.

13. The assembly for mounting a ball for rotation around multiple axes of claim 8 wherein at least one of the two rolling members contacting the second great circle is controllably driven.

* * * * *